United States Patent
Lanfermann et al.

(10) Patent No.: US 8,949,893 B2
(45) Date of Patent: Feb. 3, 2015

(54) METHOD AND A SYSTEM FOR CONSTRUCTING VIRTUAL VIDEO CHANNEL

(75) Inventors: Gerd Lanfermann, Aachen (DE); Andreas Kellner, Toa Payoh (SG)

(73) Assignee: Koninklijke Philips N.V., Eindhoven (NL)

( * ) Notice: Subject to any disclaimer, the term of this patent is extended or adjusted under 35 U.S.C. 154(b) by 1168 days.

(21) Appl. No.: 11/813,886

(22) PCT Filed: Jan. 12, 2006

(86) PCT No.: PCT/IB2006/050105
§ 371 (c)(1),
(2), (4) Date: Jul. 13, 2007

(87) PCT Pub. No.: WO2006/075301
PCT Pub. Date: Jul. 20, 2006

(65) Prior Publication Data
US 2008/0229363 A1    Sep. 18, 2008

(30) Foreign Application Priority Data

Jan. 14, 2005    (EP) .................................... 05100217

(51) Int. Cl.
| | |
|---|---|
| *H04N 5/445* | (2011.01) |
| *H04N 7/173* | (2011.01) |
| *H04N 21/2343* | (2011.01) |
| *H04N 21/258* | (2011.01) |
| *H04N 21/2668* | (2011.01) |
| *H04N 21/472* | (2011.01) |
| *H04N 21/475* | (2011.01) |

(52) U.S. Cl.
CPC .... *H04N 7/17318* (2013.01); *H04N 21/234318* (2013.01); *H04N 21/25891* (2013.01); *H04N 21/2668* (2013.01); *H04N 21/47205* (2013.01); *H04N 21/4756* (2013.01)
USPC .......................................................... 725/40

(58) Field of Classification Search
USPC ......... 25/37–38, 47, 51–53, 60–61, 105, 109, 25/112–113; 725/37–38, 47, 51–53, 725/60–61, 105, 109, 112–113
See application file for complete search history.

(56) References Cited

U.S. PATENT DOCUMENTS

| | | | |
|---|---|---|---|
| 4,739,398 A | | 4/1988 | Thomas et al. |
| 6,481,011 B1 * | | 11/2002 | Lemmons ....................... 725/47 |
| 6,601,237 B1 | | 7/2003 | Ten Kate et al. |
| 7,240,075 B1 * | | 7/2007 | Nemirofsky et al. ...... 348/14.03 |
| 7,536,706 B1 * | | 5/2009 | Sezan et al. ................... 725/113 |

(Continued)

FOREIGN PATENT DOCUMENTS

| | | |
|---|---|---|
| CN | 1206982 A | 2/1999 |
| WO | 0133848 A1 | 5/2001 |

(Continued)

*Primary Examiner* — Hunter B Lonsberry
*Assistant Examiner* — Michael Telan

(57) ABSTRACT

This invention relates to a method and a system for constructing virtual video channels comprising video content. While playing back video content to a user comprising a number of visual aspects, s/he can select at least one of the visual aspects appearing from said played back video content. Based on the selected aspects, a virtual channel is created comprising video content or a theme relating to said selected visual aspect.

14 Claims, 4 Drawing Sheets

(56) References Cited

U.S. PATENT DOCUMENTS

| | | | |
|---|---|---|---|
| 8,037,496 B1 * | 10/2011 | Begeja et al. ................... 725/53 |
| 2002/0112249 A1 | 8/2002 | Hendricks et al. |
| 2002/0144267 A1 | 10/2002 | Gutta et al. |
| 2002/0174433 A1 * | 11/2002 | Baumgartner et al. ......... 725/58 |
| 2003/0005454 A1 * | 1/2003 | Rodriguez et al. .............. 725/89 |
| 2003/0097301 A1 * | 5/2003 | Kageyama et al. ............. 705/14 |
| 2005/0071881 A1 * | 3/2005 | Deshpande ..................... 725/88 |
| 2005/0093977 A1 * | 5/2005 | Kikuchi et al. ............... 348/157 |

FOREIGN PATENT DOCUMENTS

| | | |
|---|---|---|
| WO | 02080552 A2 | 10/2002 |
| WO | 03021954 A2 | 3/2003 |
| WO | 2004030360 A1 | 4/2004 |

\* cited by examiner

METHOD AND A SYSTEM FOR CONSTRUCTING VIRTUAL VIDEO CHANNEL

FIELD OF THE INVENTION

The present invention relates to a method and a system for constructing virtual video channels comprising video content.

BACKGROUND

Virtual TV channels are generally used for creating individual media programs for a user. Traditionally, virtual channels are derived from user profiles, which are constructed in a large variety of ways. The creation of user profile-based channels where data relating to the user is used when constructing virtual channels is well known. The problem with such a profile-based approach for the construction is that the user needs to modify his profile entries before a new virtual channel theme can be constructed. For the user, which is stimulated by certain TV scenes, this operation is extremely inconvenient.

Automated profiles log the viewing behavior of a user over time and modify the user profile accordingly. Such a method would require a user to watch a certain scene repeatedly before such a system would learn and construct a virtual channel with an appropriate theme. Again, the problem with this approach is that it is not very attractive for the user, who would like to satisfy an immediate information interest.

OBJECT AND SUMMARY OF THE INVENTION

It is the object of the present invention to overcome these problems.

According to one aspect, the present invention relates to a method for constructing virtual video channels comprising video content, wherein said method comprises the steps of:
playing back video content to a user comprising a number of visual aspects,
enabling said user to select at least one of said number of visual aspects appearing from said played back video content,
receiving information identifying said at least one user selected aspect,
constructing a virtual video channel comprising video content relating to said selected visual aspect.

Thereby, a virtual channel is created in a very user friendly way where the user at any time can identify visual aspects of interest without any profile-based information about the user and subsequently receive a virtual video channel, which features the indicated aspects as a theme. Said visual aspects can as an example comprise any kind of objects (car, animal, persons, etc.) on a TV scene, a location (e.g. desert, forest), an actor, weather situation, the time of day, etc. The video content comprised in said virtual video channel can as an example comprise images, video clips or films, music or sound, documentaries, text information, etc.

In an embodiment, the step of enabling said user to select at least one of said number of visual aspects comprises:
indicating a subset of said number of visual aspects to said user where video content relating to said selected visual aspects are available, and
enabling said user to select between said subset of visual aspects.

The user can therefore, at any time, identify an object of interest and receive a virtual program featuring the indicated object as a theme. This could e.g. be implemented by pressing designated "HyperInfo" button on the remote control when the user finds an aspect in the played back video interesting. By doing so, the aspects which at that instant are recognized are highlighted and presented to the user. By selecting one or more of the highlighted aspects, one or more virtual channels are created featuring said one or more selected aspects as a theme.

In an embodiment, the step of enabling said user to select at least one of said number of visual aspects comprises:
enabling said user to rank said selected visual aspects if multiple visual aspects are selected, said ranking indicating the order of appearance of said constructed virtual video channels.

In this way the user can, when s/he identifies more than one visual aspect of interest, make a multiple selection with a predefined order. The first selection is then played/presented first, thereafter the second selection, etc. Preferably, the user can at any time end the selection which is being presented to the user and begin with the subsequent appearance according to said predefined order. As an example, the user might be interested in the objects "cow", "cat" and "dog" in this order. By selecting these three objects, three virtual video channels are constructed for featuring each of these objects as a theme. This can be a video clip, pictures, music or sound which could comprise the sound of these animals, etc. If the first theme, in this case the "cow", is a three hour program, the user can at any time end it and start with the subsequent theme, i.e. the "cat".

In an embodiment, said ranking of a visual aspect is indicated to said user with a predefined color. In this way, if several aspects are highlighted for the user, e.g. said "cow", "cat", and "dog", the user can by marking the object "cow" with yellow, the object "cat" with red and the object "dog" with green, control this appearance. Accordingly, the color blue has the function as first appearance, red the function as the second appearance and green the function as the third appearance. This color "hierarchy" would be predefined in this way. Of course, instead of using colors, numbers or similar marks could be used.

In an embodiment, the step of enabling to said user to select at least one of said number of visual aspects comprises:
checking if video content relating said selected visual aspect is available, and
indicating to said user if said video content is not available.

In this way, if there is no video content (video clips, pictures, textual information, etc.) available it is indicated to the user. The indication could as an example comprise not highlighting the aspects although the aspects have been recognized. In the case that the aspect is the object "cow", but no material exists about a cow, it might therefore not be highlighted at all for the user. The object "cow" could also be highlighted with the information/sign or the like indicating that no information is available for the object "cow". The user could further be indicated about the amount of information/data which are available for the various aspects, the quality measure of the virtual channel (e.g. indicating the accumulated significance of the identified video material), if the amount of content for certain aspects fulfills predefined requirements to create a virtual channel (e.g. minimum one hour material length).

In an embodiment, the step of constructing a virtual video channel comprises:
constructing a virtual video channel based on a combination of at least two selected visual aspects.

The user can therefore select two or more aspects which are then presented as one theme. By e.g. selecting the object "sheep" and "dog" together, e.g. by marking both with the color blue, the theme comprises the combination of these objects. This could e.g. comprise the theme dogs rounding up sheep. Another selection could be "car" and "race", with the resulting theme as formula one race.

In a further aspect, the present invention relates to a computer readable medium having stored therein instructions for causing a processing unit to execute said method.

According to another aspect, the present invention relates to a system for constructing user specific virtual video channels comprising video content, wherein said system comprises;
 means for playing back video content to a user comprising a number of visual aspects,
 means for enabling said user to select at least one of said number of visual aspects appearing from said played back video content,
 a receiver for receiving information identifying said at least one user selected aspect,
 means for constructing a virtual video channel comprising video content relating to said selected visual aspect.

DESCRIPTION OF THE DRAWINGS

In the following, the present invention, and in particular preferred embodiments thereof, will be described in more detail in connection with accompanying drawings in which.

DESCRIPTION OF PREFERRED EMBODIMENTS

Figure 1:
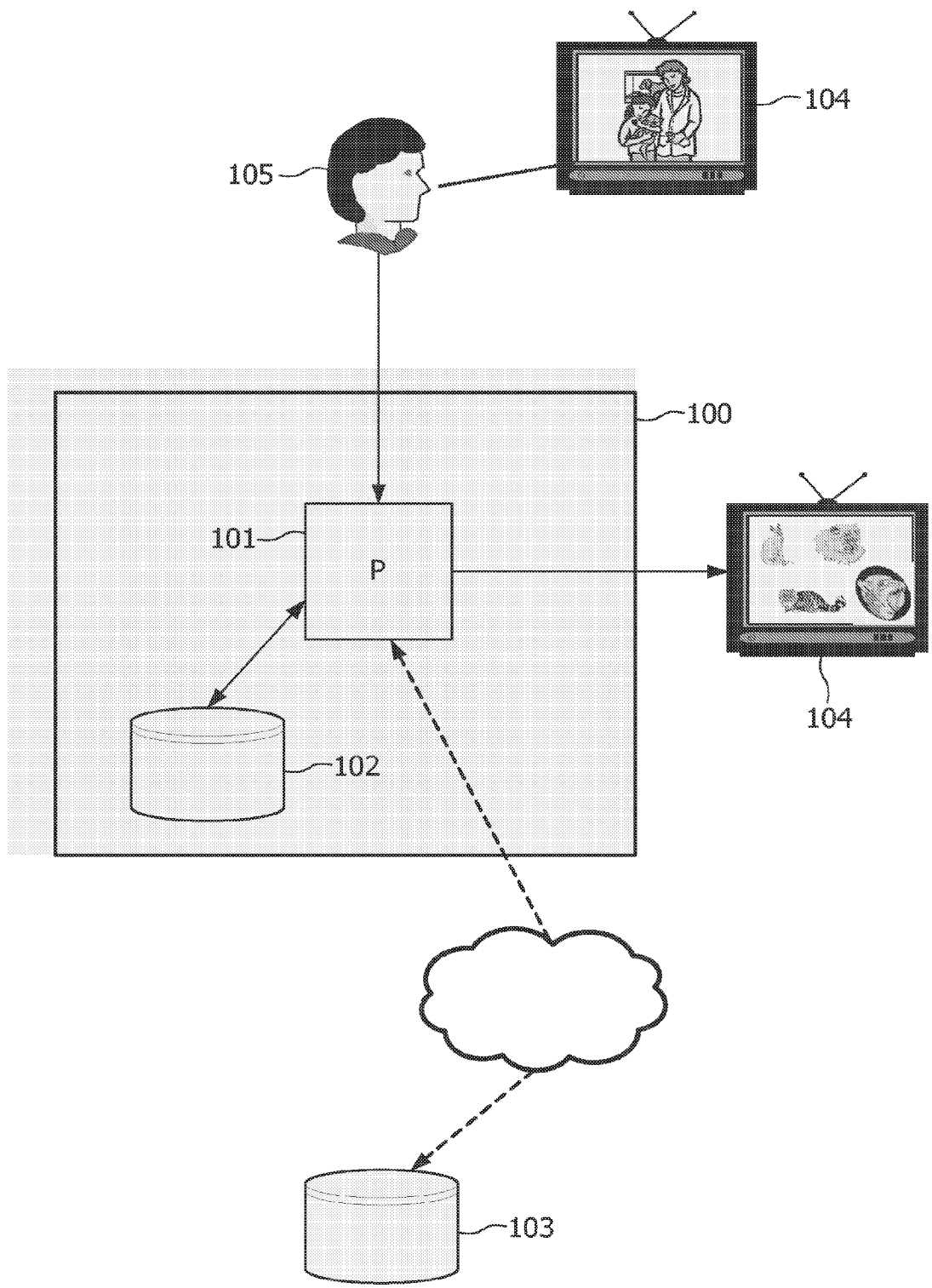
FIG. 1 illustrates a system according to the present invention for constructing a virtual video channel based on aspects displayed for a user.

FIG. 1 illustrates a system 100 according to the present invention for constructing a virtual video channel based on aspects displayed for a user 105 e.g. in scenes of a broadcasted TV program or in scenes of a program being played back 104 from a local playback device 107 such as a DVD or a video player (not shown here). The aspects can comprise any kind of objects (car, animal, persons, etc.) on a TV scene, a location (e.g. desert, forest), an actor, weather situation, the time of day, etc. In the following, it will be assumed that the aspect comprises any kind of objects.

The system as illustrated here comprises an object recognizer 101 and storage means 102, 103, which e.g. can be internal storage means 102 comprised in said system 100, or external storage means 103 accessible via a communication link such as the Internet. The object recognizer 101 analyzes the objects which are being displayed 104 for the user 105, in this example on a TV screen 106. When the user 105 is interested in a particular scene or objects in a scene, the object recognizer 101 receives a command from the user 105 to "freeze" the TV scene. This can e.g. be done by pressing a "HyperInfo" button on the remote control. The objects in the scene, which are recognized by the object recognizer 101, are then highlighted for the user 105. The user can now choose and select one or more of these highlighted objects, where after a virtual channel or additional information relating to the selected objects are made available to the user e.g. by displaying the video content, music or music play-list, or the additional information via the virtual channel to the user on the TV screen. The music play-list could e.g. be based on selection of one or more musicians. The data required for the virtual channel or the additional information is stored in the storage means 102, 103.

In one embodiment, the object analysis is based on the user's characteristics, e.g. the age of the person. If the person is young, the object recognizer filters out all objects which are not considered as relevant for this young person. Therefore, if this young person is watching a movie with ghosts, monsters and a dog, only the dog would be considered as relevant and is displayed for the user. Other scenes would be considered as forbidden. In this way, the object recognizer would follow predefined instructions. Of course, input information e.g. relating to the age of the user must be given. In this particular case, this information can be requested prior to e.g. watching said movie such as by the parent of this young person. Other examples of user's characteristics are the user's hobbies/interests, the sex of the user, etc.

Figure 2A:
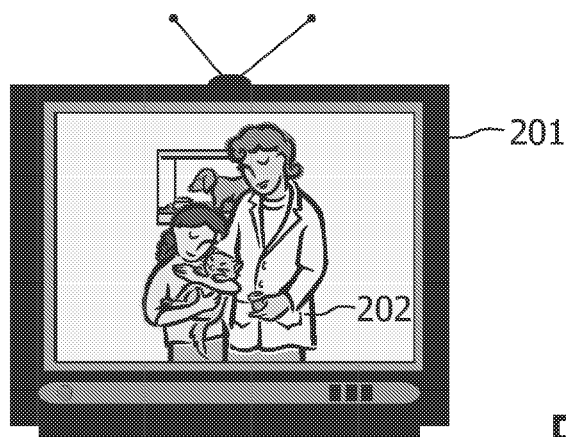
FIGS. 2a-2d show one example of the present invention, showing the steps from where a user, which is watching e.g. a broadcasted movie on a TV screen, selects an object in a scene of a TV program, where after a virtual channel or additional information related to the selected object are presented to the user.
Figure 2B:
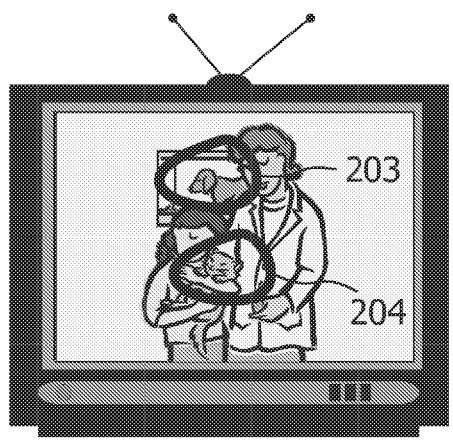
Figure 2C:
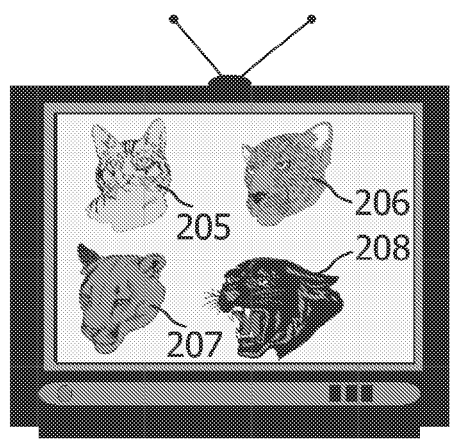
Figure 2D:
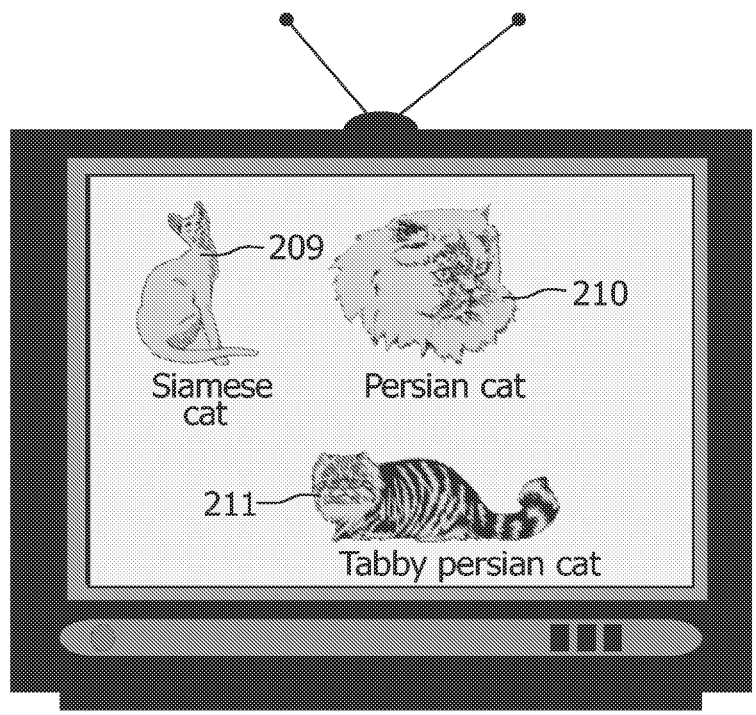

FIGS. 2a-2d show one example of the present invention, showing the steps from where a user, which is watching e.g. a broadcasted movie on a TV screen 201, selects an object in a scene of a TV program, where after a virtual channel or additional information related to the selected object are presented to the user. In FIG. 2a, the user notices the object animals in the TV program. In this particular case, the user could be a parent who wants to educate his/her child about animals, or, more particularly, about cats. By pressing a designated "HyperInfo" button on the remote control, the objects 203, 204 which are recognized by the object recognizer 101 are highlighted as illustrated by the solid lines surrounding the cat and the dog in FIG. 2b. Assuming the user selects the object cat 204, a virtual channel showing various "cat" categories 205, 206, 207, 208 (see FIG. 2c) is created, varying from the normal house cat to the panther. In this example, the user has the opportunity to select still another virtual channel from these categories and thereby obtain more detailed information. Assuming the user selects the normal house cat, various house cats can be displayed. This is illustrated in FIG. 2d, showing the Siamese cat 209, Persian cat 210, Tabby Persian cat 211. The user could even get further information, video/TV clips, etc. by selecting e.g. the Siamese cat 209. However, if such further details are not possible, the user could be notified.

During these steps, the original program that the user was watching is put on hold. The user can, at any time, access the virtual channel or go one step backwards, e.g. from FIG. 2c to FIG. 2d, and change his original choice, i.e. select the highlighted dog 203 in FIG. 2b instead of the cat 204.

In one embodiment, the presentation of the selected aspects, in this case the object "cat", is associated with a fee. This could be a single fee, i.e. associated with a selection of the object "cat", or the association could comprise multiple fees, in this case one fee for the selection of "cat", one associated with the selection of the object "house cat", etc. The fees could even depend on whether the user requests for text information, video clips, music, etc.

Figure 3:
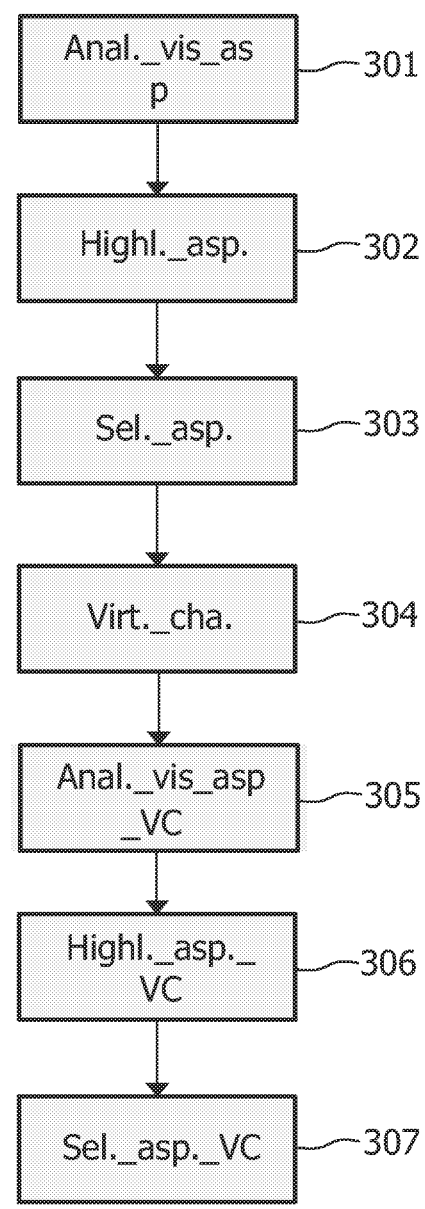
FIG. 3 illustrates the method for constructing virtual video channels comprising video content.

FIG. 3 illustrates the method for constructing virtual video channels comprising video content where initially video content comprising a number of visual aspects is played for a user. The video content can be a TV broadcast program, video/DVD movie, standstill movie or the like, comprising a number of visual aspects being presented to a user. The major visual aspects are continuously analyzed 301 (Anal._vis_asp) as the user is watching the video content. When the user is interested in a particular scene or objects in a scene, s/he can e.g. via pressing a "HyperInfo" button on the remote control freeze the current scene. It follows that the objects in the scene, which are recognized by the object recognizer are then highlighted (Highl._asp.) 302 and displayed for the user. The user now selects one or more of the highlighted aspects (Sel._asp.) 303. For the selected aspects, a virtual video channel is created (Virt._cha.) 304. For the video content displayed in the virtual video channel, steps 301-303 can be repeated, i.e. analyzing the visual aspects in the virtual channel (Anal._vis_asp_VC) 305, highlighting the analyzed aspects (Highl._asp._VC) 306 when the user is interested in a particular scene and again enabling the user to select one or more of the highlighted aspects (Sel._asp._VC) 307. At any time, the user can go one or more steps backwards and e.g. correct his/her choice.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements and by means of a suitably programmed computer. In a device claim enumerating several means, several of these means can be embodied by one and the same item of hardware. The mere fact that certain measures are recited in mutually different, dependent claims does not indicate that a combination of these measures cannot be used to advantage.

The invention claimed is:

1. A method for constructing virtual video channels comprising video content, wherein said method comprises the steps of:
    playing back video content from a single video channel to a user, the content comprising a number of visual aspects,
    freezing said played back video content,
    in response to said freezing and without requiring user input, automatically identifying to the user a plurality of said number of visual aspects;
    checking if additional video content relating to at least one of said identified plurality of visual aspects is available from a source separate from the single video channel and if not, indicating an unavailability status to the user; and, indicating to the user a subset of said identified plurality where for each such indicated visual aspect in said subset, said additional video content relating to that visual aspect is available,
    enabling said user to select between said subsets of visual aspects,
    receiving information identifying said at least one user selected aspect,
    constructing a virtual video channel comprising at least some of the additional video content relating to said selected visual aspect.

2. A method according to claim 1, wherein the step of enabling said user to select at least one of said number of visual aspects comprises
    enabling said user to rank said selected visual aspects if multiple visual aspects are selected, said ranking indicating an order of appearance of said constructed virtual video channels.

3. A method according to claim 2, wherein said ranking of a visual aspect is indicated to said user with a predefined color.

4. A method according to claim 1, wherein the step of constructing a virtual video channel comprises
    constructing a virtual video channel based on a combination of at least two selected visual aspects.

5. A computer-readable, non-transitory medium having stored therein instructions for causing a processing unit to execute a method according to claim 1.

6. A method according to claim 1 further comprising:
    providing to the user a presentation of video content related to said selected visual aspect.

7. A method according to claim 6 further comprising:
    unfreezing said frozen playing back of video content upon termination of said presentation of video content related to said selected visual aspect.

8. A method according to claim 6 wherein
    said additional content is obtained from an external storage means, and
    said presentation of video content related to said selected visual aspect comprises providing said user with additional visual aspects relating to categories of said selected visual aspect.

9. The method of claim 1 wherein availability of said video content relating to said selected visual aspects is determined at least in part on user characteristics.

10. The method of claim 1 further comprising:
    upon playing back video content from the constructed virtual video channel, repeating said freezing, indicating, enabling, and receiving steps with respect to the constructed virtual video channel, and
    constructing a second virtual video channel.

11. A system for constructing user specific virtual video channels comprising video content, wherein said system comprises:
    means for playing back video content from a single video channel to a user, said played back video content comprising a number of visual aspects,
    means for freezing said played back video content,
    means for automatically identifying to the user a plurality of said number of visual aspects without requiring user input;
    means for checking if additional video content relating to at least one of said identified plurality of visual aspects is available from a source separate from the single video channel and if not, indicating an unavailability status to the user; and, indicating to the user a subset of said identified plurality where for each such indicated visual aspect in said subset, said additional video content relating to that visual aspect is available,
    means for enabling said user to select between said subsets of visual aspects,
    means for receiving information identifying said at least one user selected aspect,
    means for constructing a virtual video channel comprising at least some of said additional video content relating to said selected visual aspect.

12. A system according to claim 11 further comprising:
    means for providing to the user a presentation of video content related to said selected visual aspect.

13. A system according to claim 12 further comprising:
    means for unfreezing said frozen playing back of video content upon termination of said presentation of video content related to said selected visual aspect.

14. A system according to claim 12 wherein
    said additional content is obtained from an external storage means, and said presentation of video content related to said selected visual aspect comprises providing said user with additional visual aspects relating to categories of said selected visual aspect.

* * * * *